(12) United States Patent
Yajima

(10) Patent No.: US 10,142,598 B2
(45) Date of Patent: Nov. 27, 2018

(54) WEARABLE TERMINAL DEVICE, PHOTOGRAPHING SYSTEM, AND PHOTOGRAPHING METHOD

(71) Applicant: Sony Corporation, Tokyo (JP)

(72) Inventor: Chikashi Yajima, Kanagawa (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 191 days.

(21) Appl. No.: 14/291,197

(22) Filed: May 30, 2014

(65) Prior Publication Data

US 2015/0350536 A1   Dec. 3, 2015

(51) Int. Cl.
*H04N 5/232*   (2006.01)
*H04N 7/18*   (2006.01)

(52) U.S. Cl.
CPC ............. *H04N 7/188* (2013.01); *H04N 5/232* (2013.01); *H04N 5/23219* (2013.01); *H04N 5/23222* (2013.01)

(58) Field of Classification Search
CPC .... H04N 5/23219; H04N 7/185; H04N 7/188; H04N 5/2251; H04N 5/23248; H04N 5/23251; H04N 5/23245; H04N 1/00973; H04N 5/2324; H04N 5/217; H04N 7/183; G06F 1/163; G06F 3/015; G06F 3/005; G06N 3/063
See application file for complete search history.

(56) References Cited

U.S. PATENT DOCUMENTS

| | | | | |
|---|---|---|---|---|
| 2005/0237383 A1* | 10/2005 | Soga | ....................... | H04N 5/232 348/36 |
| 2006/0044404 A1* | 3/2006 | Hatanaka | ........... | H04N 5/23248 348/208.4 |
| 2006/0202816 A1* | 9/2006 | Crump | ............... | A61B 5/02055 340/539.12 |
| 2008/0062291 A1* | 3/2008 | Sako | ................... | G02B 27/0093 348/294 |
| 2008/0204564 A1* | 8/2008 | Yumiki | .............. | H04N 5/23219 348/208.99 |
| 2008/0211941 A1* | 9/2008 | Deever | ................ | H04N 5/2258 348/262 |
| 2009/0051785 A1* | 2/2009 | Kamada | ................. | H04N 7/183 348/231.5 |
| 2009/0115892 A1* | 5/2009 | Sako | .................... | H04N 1/0097 348/376 |
| 2011/0142414 A1* | 6/2011 | Lee | ..................... | H04N 5/23248 386/242 |
| 2011/0279691 A1* | 11/2011 | Ishii | ................... | H04N 1/00323 348/207.99 |

(Continued)

FOREIGN PATENT DOCUMENTS

JP   2005-260933 A   9/2005

*Primary Examiner* — Nathnael Aynalem

(74) *Attorney, Agent, or Firm* — Xsensus, LLP

(57) ABSTRACT

A wearable terminal device includes circuitry configured to receive sensor data from one or more sensors, wherein the sensor data corresponds to a behavior of a user in possession of the wearable terminal device. The circuitry is configured to determine, based on the sensor data, the behavior of the user. The circuitry is configured to control, based on the determined behavior of the user, a photographing interval of a camera.

21 Claims, 9 Drawing Sheets

(56) References Cited

U.S. PATENT DOCUMENTS

| | | | |
|---|---|---|---|
| 2012/0229661 A1* | 9/2012 | Sekiguchi | A61B 5/0205 348/208.4 |
| 2013/0242120 A1* | 9/2013 | Venkatraman | H04N 5/225 348/208.4 |
| 2014/0204235 A1* | 7/2014 | Wexler | H04N 5/23222 348/222.1 |

* cited by examiner

FIG. 3

| Behavior | Photographing interval[min] |
|---|---|
| Walking | 3 |
| Running | 1 |
| Bus | — |
| ⋮ | ⋮ |

| Measurement item | Average value | Photographing interval [min] |
|---|---|---|
| Body temperature | a [degree] | A |
| Pulse | b [beat/min] | B |
| Heart rate | c [beat/min] | C |
| Blood pressure | d1 [mmHg] | D1 |
|  | d2 [mmHg] | D2 |
| ⋮ | ⋮ | ⋮ |

FIG. 8

| Emotion | Photographing interval [min] |
|---|---|
| Glad | P1 |
| Angry | P2 |
| Sad | P3 |
| Happy | P4 |
| Nervous | P5 |
| ⋮ | ⋮ |

WEARABLE TERMINAL DEVICE, PHOTOGRAPHING SYSTEM, AND PHOTOGRAPHING METHOD

BACKGROUND

Technical Field

The present disclosure relates to photography using a wearable terminal device and related control processing based on sensor inputs.

Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

Wearable devices may include a camera for capturing image data. The camera may be controlled such that photography is captured automatically at a fixed photographing interval. For example, a camera may be included in a wearable device for capturing image data in a surrounding area relative to a user for the purpose of creating a "life log" corresponding to the user.

SUMMARY

Wearable devices that include a camera that automatically captures image data at a fixed interval lack the capability to adapt the photographing interval and therefore, there exists a problem that although the surrounding area and/or object being photographed changes very little relative to the user (e.g., the user is resting and the surrounding environment does not change during the photographing), redundant image data is still being captured. In other words, there may be times when photography at the predefined fixed interval is inappropriate because such photography would result in substantially duplicate photographs, which needlessly consumes storage space and processing capacity. In light of this problem, a device, method and system of capturing image data with a wearable device that includes circuitry to control a photographing interval based on a detected state of the user and/or other contextual factors is needed.

In one or more embodiments, a wearable terminal device includes circuitry configured to receive sensor data from one or more sensors, wherein the sensor data corresponds to a behavior of a user in possession of the wearable terminal device. The circuitry is configured to determine, based on the sensor data, the behavior of the user. The circuitry is configured to control, based on the determined behavior of the user, a photographing interval of a camera.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3 illustrates a non-limiting exemplary photographing interval table for controlling a photographing interval of a wearable terminal device based on a detected behavior, according to certain embodiments;

FIG. 7 illustrates a non-limiting exemplary photographing interval table for controlling a photographing interval of a wearable terminal device based on a detected physiological state, according to certain embodiments;

FIG. 8 illustrates a non-limiting exemplary photographing interval table for controlling a photographing interval of a wearable terminal device based on a detected emotional state, according to certain embodiments;

DETAILED DESCRIPTION

Figure 1A:
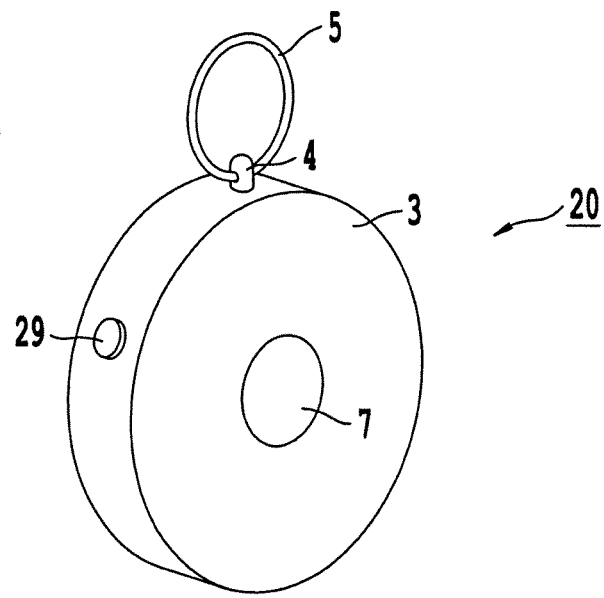
FIGS. 1A and 1B illustrate a non-limiting exemplary external views of a wearable terminal device, according to certain embodiments.

Referring now to the drawings, wherein like reference numerals designate identical or corresponding parts throughout the several views.

Figure 1B:
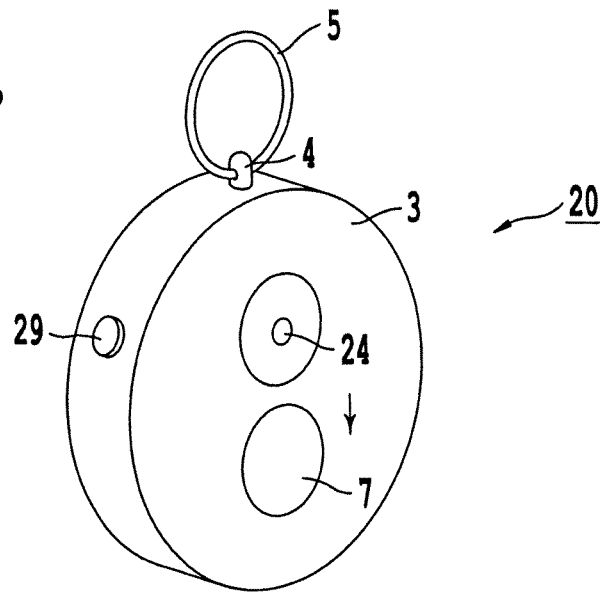

FIGS. 1A and 1B illustrate non-limiting exemplary external views of a wearable terminal device, according to certain embodiments. The wearable terminal device 20 shown at FIGS. 1A and 1B includes a main body 3, a projection 4, a ring 5, a slide part 7, a camera 24, and an operation key 29. FIG. 1A illustrates the wearable terminal device 20 in a state in which the slide part 7 is in a closed position in order to protect the lens of camera 24, and FIG. 1B illustrates the slide part 7 in the open position. In the exemplary embodiments shown in FIGS. 1A and 1B, the slide part 7 may be slid along tracks, grooves, etc., formed in the main body 3 such that it may move up and down in order for the slide part 7 to be placed in the opened and closed position.

The operation key 29 may be a switch or a button for controlling power to the wearable terminal device 20. In certain embodiments, an automatic imaging process according to the present disclosure may be initiated simultaneously when powering on the wearable terminal device 20 via the operation key 29. Other functions may also be assigned to the operation key 29, such as the manual capturing of images by the camera 24. Further, a wearable terminal device according to the present disclosure is not limited to having a single operation key, but rather more operation keys with other functions may also be included in the device. In certain embodiments, the automatic imaging process according to the present disclosure may also be stopped by pressing the operation key 29.

A hole is formed in the projection 4 such that the ring 5 may be passed through the hole. The ring 5 provides a structure in which the user may secure the wearable terminal device 20 to his or her body. For example, a lanyard or other securing mechanism may be inserted through the ring 5 such that the user may wear the wearable terminal device 20 around his or her neck, his or her wrist, or on his or her clothing. Moreover, certain embodiments may include a specialized adapter such that the user may affix the wearable terminal device 20 to his or her body or clothes. For example, there may be a specialized adapter such that the user may secure the wearable terminal device 20 to his or her wrist, similar to the case of a wrist watch.

FIG. 1B illustrates the wearable terminal device 20 with the slide part 7 in the open position. When the wearable terminal device 20 is in the state shown in the example of FIG. 1B, the automatic capturing of image data by the camera 24 may be performed at a predetermined or calculated photographing interval. For example, the user may wear the wearable terminal 20 around his or her neck with the slide part 7 in the open position such that sequential images are captured at an interval defined by the photographing interval. Thus, the user is provided with a running historical photography log documenting actions and events of the day. As will be discussed in detail in later paragraphs, the photographing interval at which the camera 24 captures the image data may be changed based on various factors relating to the user's behavior, such as his or her emotional state, physiological state, actions being performed, or a combination thereof.

Figure 2:
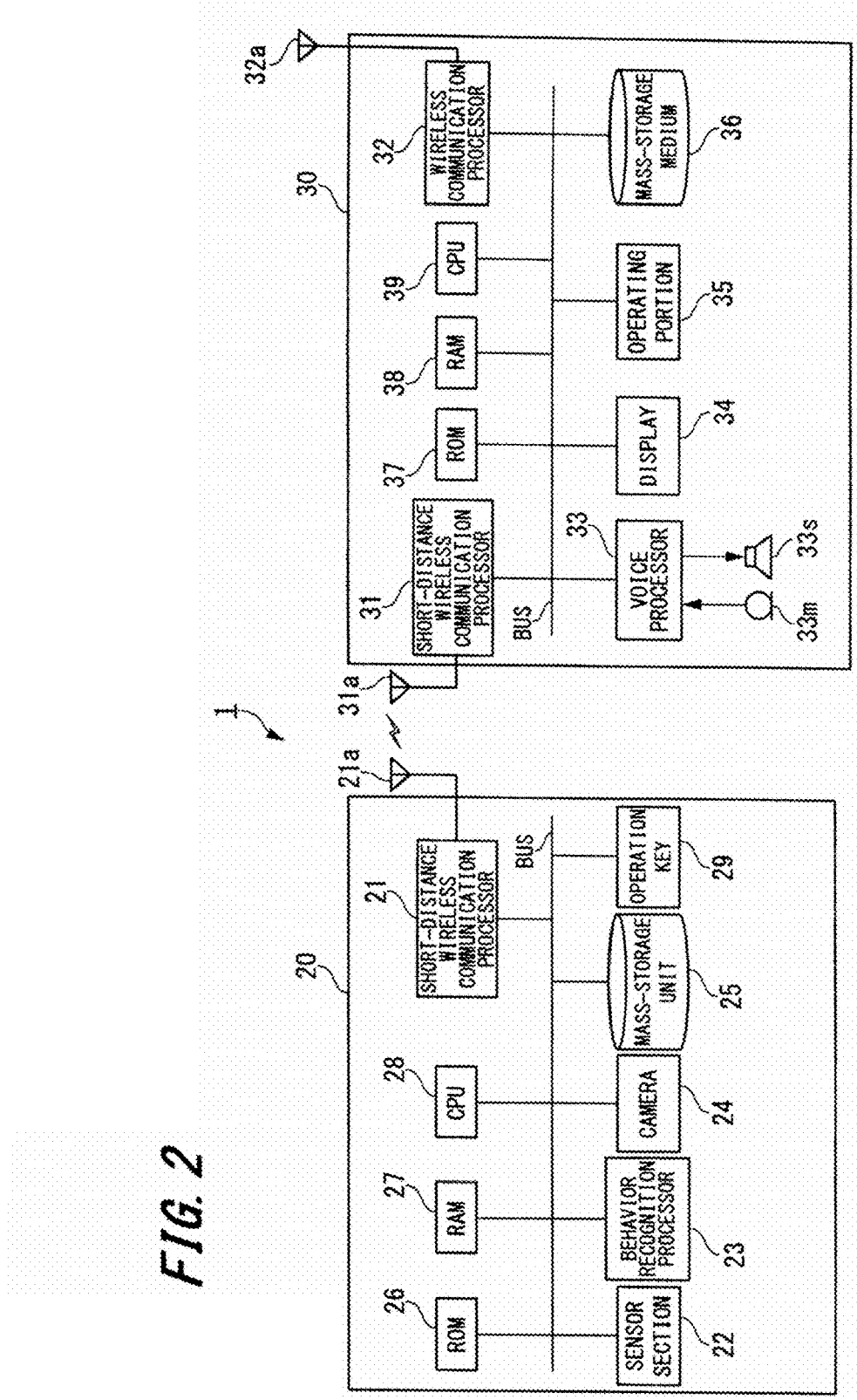
FIG. 2 illustrates a non-limiting exemplary block diagram including the internal structure of a wearable terminal device and a communication apparatus that form a photographing system, according to certain embodiments.

FIG. 2 illustrates a non-limiting exemplary block diagram including the internal structure of a wearable terminal device in a communication apparatus that form a photographing system, according to certain embodiments. In particular, FIG. 2 illustrates the internal structure of the wearable terminal device 20 and a communication apparatus 30, which form a photographing system 1.

Referring first to the block diagram corresponding to the wearable terminal device 20, the wearable terminal device 20 includes a short-distance wireless processor 21 connected to an antenna 21a, a sensor section 22, a behavior recognition processor 23, a camera 24, a mass-storage medium 25, read only memory (ROM) 26, random access memory (RAM) 27, central processing unit (CPU) 28, and operation key 29. The wearable terminal device 20 also includes a bus on which various data signals may be communicated amongst the various elements included in the wearable terminal device 20.

The antenna 21a may transmit/receive electromagnetic wave signals to/from other external apparatuses, and the short-distance wireless processor 21 and/or the CPU 28 may control the wireless communication performed between the wearable terminal device 20 and the other external apparatuses. Bluetooth and IEEE 802.11 are non-limiting examples of wireless communication protocols that may be used for inter-device communication via the short-distance wireless communication processor 21 and the antenna 21a.

The sensor section 22 may include one or more motion sensors capable of determining various aspects of motion with respect to the wearable terminal device 20. For example, the sensor section 22 may include one or more gyroscopes, accelerometers, geomagnetic sensors, or the like. For example, when the sensor section 22 includes a triaxial acceleration sensor, the acceleration sensor may regularly output an acceleration value corresponding to the X-axis, the Y-axis, and the Z-axis relative to the wearable terminal device 20. Based on the acceleration values generated by the sensor, the CPU 28 and/or the behavior recognition processor 23 may determine a behavior of the user in possession of the wearable terminal device 20 by matching the indication of motion (e.g., the acceleration values) generated by the sensor section 22 with one or more predetermined behaviors.

The behavior recognition processor 23 receives an indication of motion from the sensor section 22 and determines a behavior of the user of the wearable terminal device 20 based on the received indication of motion. For example, the behavior recognition processor 23 may receive motion sensor data from the sensor section 22 and determine an action performed by the user based on an analysis of the sensor data. For example, the behavior recognition processor 23 may determine that the motion data received from the sensor section 22 corresponds to an action of walking, running, driving, etc., based on indications of velocity, speed, etc. In response to determining the action or general behavior based on the input from the sensor section 22, the behavior recognition processor 23 may output the determined behavior to the CPU 28.

Image data may be captured by the wearable terminal device 20 via the camera 24, which may include one or more image sensors comprised of a charge coupled device (CCD), complementary metal oxide semiconductor (CMOS), or the like. For example, an image signal may be generated by the camera 24 when an image formed on a light receiving surface through a lens included in the camera is photoelectrically converted. The lens of the camera 24 may be arranged in certain embodiments on a surface of the wearable terminal device 20 that typically opposes the user's body when he or she is wearing the wearable terminal device 20. The CPU 28 may, in certain aspects over the present disclosure, include one or more processing circuits for performing image analysis processing on still and/or moving image data captured by the camera 24. Alternatively, the camera 24 may include dedicated processing circuits for performing image processing alone or in conjunction with the CPU 28. In certain embodiments, the image processing circuitry of the camera 24 and/or the CPU 28 may include facial recognition analysis or other image processing for determining contents of an image and/or temporal changes in the images.

The mass-storage medium 25 may store the image data captured by the camera 24. In certain embodiments, the mass-storage medium 25 may be comprised of one or more semiconductor memory units, such as flash memory. Image data stored in the mass-storage medium 25 may be regularly transmitted to the communication apparatus 30 under the control of the CPU 28.

The ROM 26 may be a memory array comprised of nonvolatile memory units for storing program instructions corresponding to processing algorithms discussed in the present disclosure. Moreover, the ROM 26 may store additional instructions corresponding to other processing executed by the wearable terminal device 20 processing circuitry, such as instructions for controlling an operating system executed on the wearable terminal device 20 via, for example, the CPU 28.

The RAM 27 may be comprised of a memory array of volatile memory units that may be utilized as working memory by the CPU 28 while executing the processing and algorithms of the present disclosure.

The CPU 28 may include one or more processing circuits for controlling each element in the wearable terminal device 20 for performing features related to communication control, image processing and control, and other kinds of signal processing. The CPU 28 may perform these features by executing instructions stored in the ROM 26. Alternatively or in addition to the local storage of the ROM 26, the features of the present disclosure may be executed using instructions stored in an external device accessed on a network or on a non-transitory computer readable medium accessed by the wearable terminal device 20. In certain embodiments, the CPU 28 controls a photographing interval used for determining a time interval at which the camera 24 performs automatic capturing of image data. In certain embodiments, the CPU 28 may control the photographing interval of the wearable terminal device 20 based on an input from the behavior recognition processor 23 indicating a behavior exhibited by the user in possession of the wearable terminal device 20. Aspects of controlling image data capture based on a determined photographing interval using inputs from the behavior recognition processor 23 will be discussed in greater detail in later paragraphs.

The operation key 29 may include in one or more buttons similar to external control elements (e.g. power control, volume control, standby control, etc.). The operation key 29 may generate an operation signal based on a detected input generated in response to a user operating the operation key 29. The operation signals generated by the operation key 29 may be supplied to the CPU 28 for performing processing related to the control of the wearable terminal device 20. For example, processing related to the control of the automatic capturing of image data based on a determined photographing interval may be performed in response to an operation signal generated by the operation key 29.

Turning now to the communication apparatus 30, the communication apparatus 30 includes a short-distance wireless communication processor 31 connected to an antenna 31*a*, a wireless communication processor 32 connected to an antenna 32*a*, a voice processor 33 connected to a microphone 33*m* and a speaker 33*s*, a display 34, an operating portion 35, a mass-storage medium 36, ROM 37, RAM 38, and CPU 39. For simplicity, the present disclosure assumes that the communication apparatus 30 is a mobile device such as a smartphone or a tablet device. However, the present disclosure does not limit the communication apparatus 30 to any particular structure or implementation. The communication apparatus 30 also includes a bus for communicating data signals amongst the various elements included in the communication apparatus 30.

The antenna 31*a* may transmit/receive electromagnetic wave signals to/from other external apparatuses such as the wearable terminal device 20. Communication control processing of the electromagnetic wave signals transmitted to and from the antenna 31*a* may be performed under the control of the short-distance wireless communication processor 31 and/or the CPU 39. Moreover, it may be assumed for simplicity that the short-distance wireless communication processor 31 is functionally equivalent to the short-distance wireless communication processor 21 included in the wearable terminal device 20.

The wireless communication processor 32 controls communications performed between the communication apparatus 30 and other external devices via the antenna 32*a*. For example, the wireless communication processor 32 may control communication between base stations for cellular telephone communication performed with the communication apparatus 30.

The voice processor 33 demodulates and/or decodes audio data stored in memory and/or audio data received from the wireless communication processor 32 and/or the microphone 33*m*.

The microphone 33*m* detects surrounding audio and converts the detected audio into an audio signal. The audio signal may then be output to the voice processor 33 and/or the CPU 39 for further processing. Moreover, the voice processor 33 may output the audio signal to the wireless communication processor 32 such that the audio signal may be transmitted via the antenna 32*a*.

The speaker 104 emits an audio signal corresponding to audio data supplied from the voice processor 33.

The display 34 may be a liquid crystal display (LCD), an organic electroluminescent display panel (OLED), or another suitable display screen technology. In addition to displaying still and moving image data, the display 34 may display operational inputs, such as numbers or icons, which may be used for control of the communication apparatus 30. The display 34 may additionally display a graphical user interface with which a user may control aspects of the communication apparatus 30. Further, the display 34 may display characters in images received by the communication apparatus 30 over a network and/or stored in a memory such as the mass-storage medium 36. For example, the communication apparatus 30 may access a network such as the internet and display text and/or image data transmitted from a Web server.

The operating portion 35 may include an operation interface for controlling the communication apparatus 30. For example, the operating portion 35 may be implemented as a touch screen on which a user may perform touch operations for controlling the communication apparatus 30. Assuming the operation portion 35 is implemented as a touch panel, the operating portion 35 may include a physical touch panel display integrated with the display 34, as well as a touch panel driver. The touch panel may include one or more touch sensors for detecting an input operation on an operating surface of the touch panel display screen. In one or more embodiments, the operating portion 35 when implemented as a touch panel display disposed adjacent to the display 34 (e.g. laminated), or the touch panel display may be formed integrally with the display 34. The display 34 and the operating portion 35 may be surrounded by protective casing, which may also enclose the other elements included in the communication apparatus 30.

The mass-storage medium 36 is a nonvolatile memory storage unit similar to the mass-storage medium 25 of the wearable terminal device 20. The mass-storage medium 36 may store image data and other data received or generated by the communication apparatus 30. For example, the mass-storage medium 36 may store image data received by the communication apparatus 30 from the wearable terminal device 20.

The ROM 37 is nonvolatile memory for storing instructions corresponding to processes and algorithms according to the present disclosure. Further, the ROM 37 may store instructions corresponding to processing for other processing features performed by the communication apparatus 30. For example, the ROM 37 may store instructions corresponding to an operating system executed on a communication apparatus 30.

The RAM 38 includes one or more volatile memory units may be used as working memory by the CPU 39 when executing processing corresponding to the communication apparatus 30.

The CPU 39 may include one or more processing circuits, and may control each element in the communication apparatus 30 to perform features related to communication control, audio signal processing, control for the audio signal processing, image processing and control, and other kinds of signal processing. The controller may control these features by executing instructions stored in the ROM 37. Alternatively or in addition to the local storage within the communication apparatus 30, the control features executed the CPU 39 may be performed using instructions stored in an external device accessed on a network or on a non-transitory computer readable medium accessed by the communication apparatus 30.

Next, FIG. 3 illustrates a non-limiting exemplary photographing interval table for controlling a photographing interval of a wearable terminal device based on a detected behavior, according to certain embodiments. In certain embodiments, the interval table 41 illustrated in FIG. 3 may be stored in a memory included in the wearable terminal device 20 and/or the communication apparatus 30. The exemplary photographing interval table 41 of FIG. 3 includes columns for "behavior" and "photographing interval (min)" corresponding to a detected behavior determined based on sensor inputs according to the present disclosure and the corresponding photographing intervals assigned to each determined behavior, respectively. For example, referring to the data included in the photographing interval table 41, the behavior recognition processor 23 may determine, based on motion sensor inputs received from the sensor section 22, that a user is performing a behavior corresponding to "walking." Based on this determination result, the behavior recognition processor 23 may output the determined behavior to the CPU 28. In response to receiving the determined behavior from the behavior recognition processor 23, the CPU 28 may access the photographing interval table 41 from the ROM 26. Additionally, the CPU 28 may determine, based on the data included in the photographing interval table 41, that a photographing interval of 3 minutes corresponds to the behavior of walking. The CPU 28 may then control the camera 24 to automatically capture image data at the determined photographing interval. For example, assuming the CPU determines a photographing interval of 3 minutes is to be applied, the CPU 28 may control the camera 24 such that image data is captured once every 3 minutes. Implementations in which the camera 24 captures still images may correspond to capturing a single image with the camera 24 once every 3 minutes. In other implementations in which the camera 24 captures moving image data, the CPU 28 may control the camera 24 such that the camera 24 captures a predetermined time period of video data once every 3 minutes (e.g. 5 seconds of video is captured once every 3 minutes). Processing similar to the processing described above for the example of walking may also be applied to determine that the user is running, and based on the determination that the user is running the CPU 28 may adjust the photographing interval of the camera 24 such that image data is captured once per minute. Accordingly, by adjusting the photographing interval such that image data is captured more frequently, the processing provides the advantage of capturing image data when it is more likely that the environment surrounding the wearable terminal device 20 is changing more frequently due to the increased motion of the device. That is, when the user is walking it may not be necessary for image data to be captured as frequently as when the user is running because the surrounding environment with respect to the wearable terminal device 20 does not change as frequently or as dramatically when the user is walking compared to the case in which the user is running. In another example, the behavior recognition processor 23 may determine that the user is performing a behavior corresponding to bus travel. The determination that the user is riding in a vehicle such as in a bus may be determined based on the rate of change of motion detected by the sensor section 22, or by other geospatial location inputs such as a GPS signal. In response to receiving an indication that the user is currently riding on a bus, the CPU 28 may control the camera 24 such that no photography is automatically captured at the photographing interval.

The behavior and photographing interval data included in the photographing interval table 41 is not limiting and is provided herein merely for exemplary illustration purposes. Other behaviors and/or photographing intervals may be included in photographing interval tables in embodiments according to the present disclosure. Moreover, a user may manually enter or adjust behaviors in corresponding photographing intervals, for example, by performing inputs via the operating portion 35 on the communication apparatus 30.

Figure 4:
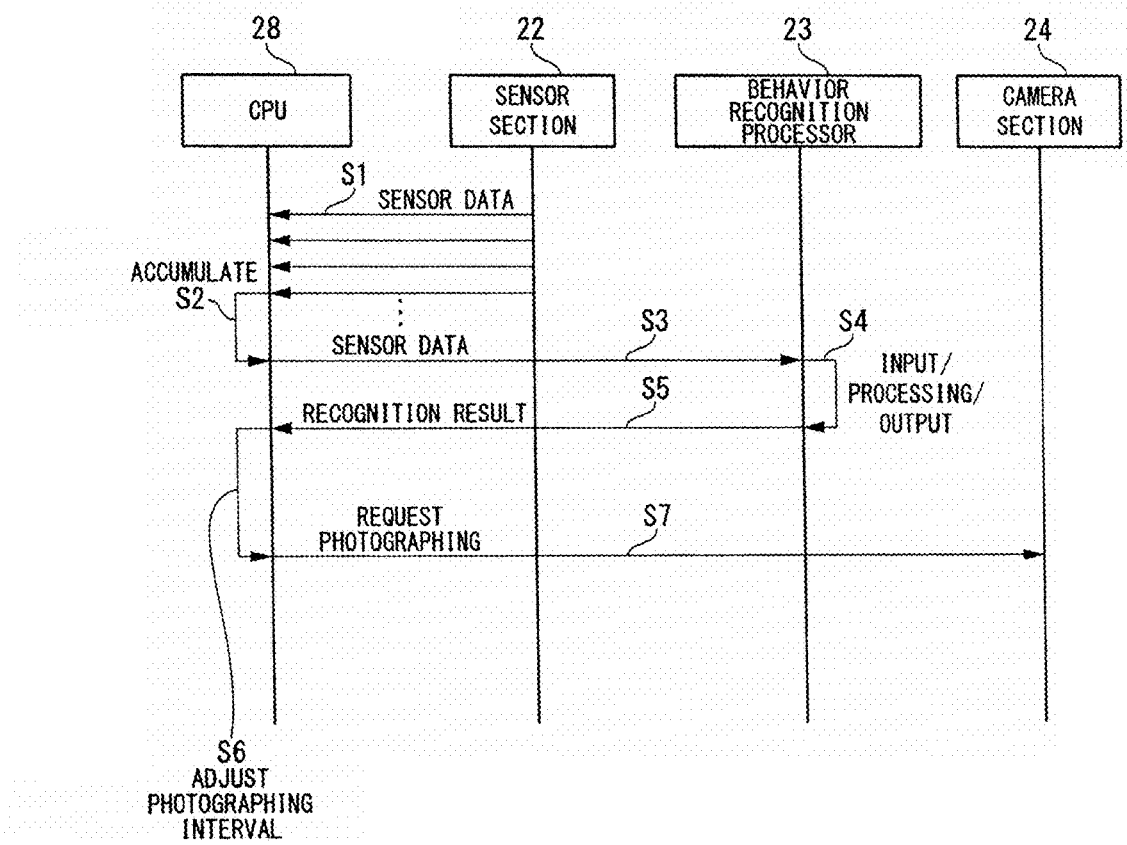
FIG. 4 illustrates a non-limiting exemplary sequence diagram for controlling a photographing interval of a wearable terminal device, according to certain embodiments.

Next FIG. 4 illustrates a non-limiting exemplary sequence diagram for controlling a photographing interval of a wearable terminal device, according to certain embodiments. The non-limiting example of FIG. 4 assumes the processing described in the sequence diagram is performed by elements included in the wearable terminal device 20. However, the processing described in FIG. 4 may be altered such that it is implemented in other devices or a combination of devices (e.g., by a combination of processing circuitry included in the wearable terminal device 20 and the communication apparatus 30).

At step S1, the sensor section 22 outputs detected sensor data based on a motion of the wearable terminal device 22. For example, the sensor section 22 at step S1 may output sensor data that includes one or more values corresponding to an acceleration, velocity, etc. in one more axes with respect to the wearable terminal device 20.

At step S2, the CPU 28 receives the sensor data sent from the sensor section 22, and the CPU 28 stores the received sensor data in the RAM 27 (or another storage medium). In certain embodiments, the CPU 28 may store the received sensor data for a predetermined time period such that the sensor data over the time period accumulates, e.g., as a time series. Accordingly, a user's behavior or action performed during this time interval may be processed based on, for example, temporal changes in the sensor data across time. In certain embodiments, the CPU 28 may control the time during which the sensor data is stored prior to proceeding to step S3. For example, if the behavior recognition processor 23 previously determines that the user is performing a walking action, the CPU 28 may control the storage of received sensor data such that a greater amount of sensor data is stored relative to a previously determined state in which the user is running. For example, the CPU 28 may store 30 seconds of sensor data in the case in which the user is previously determined to be walking, and store 10 seconds of sensor data when it is previously determined that the user is running. The stored sensor data may then be analyzed by processing circuitry to determine a current behavior, and the process of storing and analyzing the sensor data may be repeated.

The skilled artisan will appreciate that the accuracy of the determination of behaviors and actions performed by the behavior recognition processor 23 (or other circuitry) will increase as the amount of sensor data analyzed increases. Accordingly, controlling the storage amount via the CPU 28 improves accuracy of the behavior recognition result when a current or immediately preceding action is known to have occurred. Moreover, since the operation rate of the CPU 28 can be changed according to a user's determined action or behavior, consumption of electric power by the wearable terminal device 20 may also be minimized.

At step s3, the CPU 28 transmits the accumulated sensor data stored in the RAM 27 to the behavior recognition processor 23.

At step S4, the behavior recognition processor 23 receives the sensor data transmitted from the CPU 28, and the behavior recognition processor 23 performs processing related to a determination of a behavior or an action performed by a user in possession of the wearable terminal device 20. The behavior recognition processor 23 generates a recognition result based on the analysis of the sensor data received at step S4, and the recognition result is transmitted by the behavior recognition processor 23 to the CPU 28 at step S5.

At step S6, the CPU 28 receives the recognition result transmitted by the behavior recognition processor 23. Based on the received recognition result, the CPU 28 performs processing related to the control/adjusting of a photographing interval corresponding to the camera 24. In one or more embodiments, the CPU 28 at step S6 may reference a photographing interval table such as the photographing interval table 41 shown in FIG. 3. In other embodiments, the CPU 28 may apply the recognition result to a mathematical formula for determining a photographing interval corresponding to the camera 24. In the example where a photographing interval table is used at step S6, the CPU 28 selects a corresponding photographing interval based on the received recognition result. In addition, in certain embodiments, the CPU 28 may adjust a storage time of the received sensor data, as discussed above with regard to the processing performed at step S1.

At step S7, the CPU 28 transmits a photographing request signal to the camera 24 at a frequency corresponding to the photographing interval. Accordingly, the CPU 28 controls the camera 24 such that the camera 24 captures image data at an interval corresponding to the determined photographing interval from step S6. In response to receiving the photographing request signal at step S7, the camera 24 captures the image data at the determined photographing interval and stores the captured image data in the mass-storage medium 25.

Figure 5:
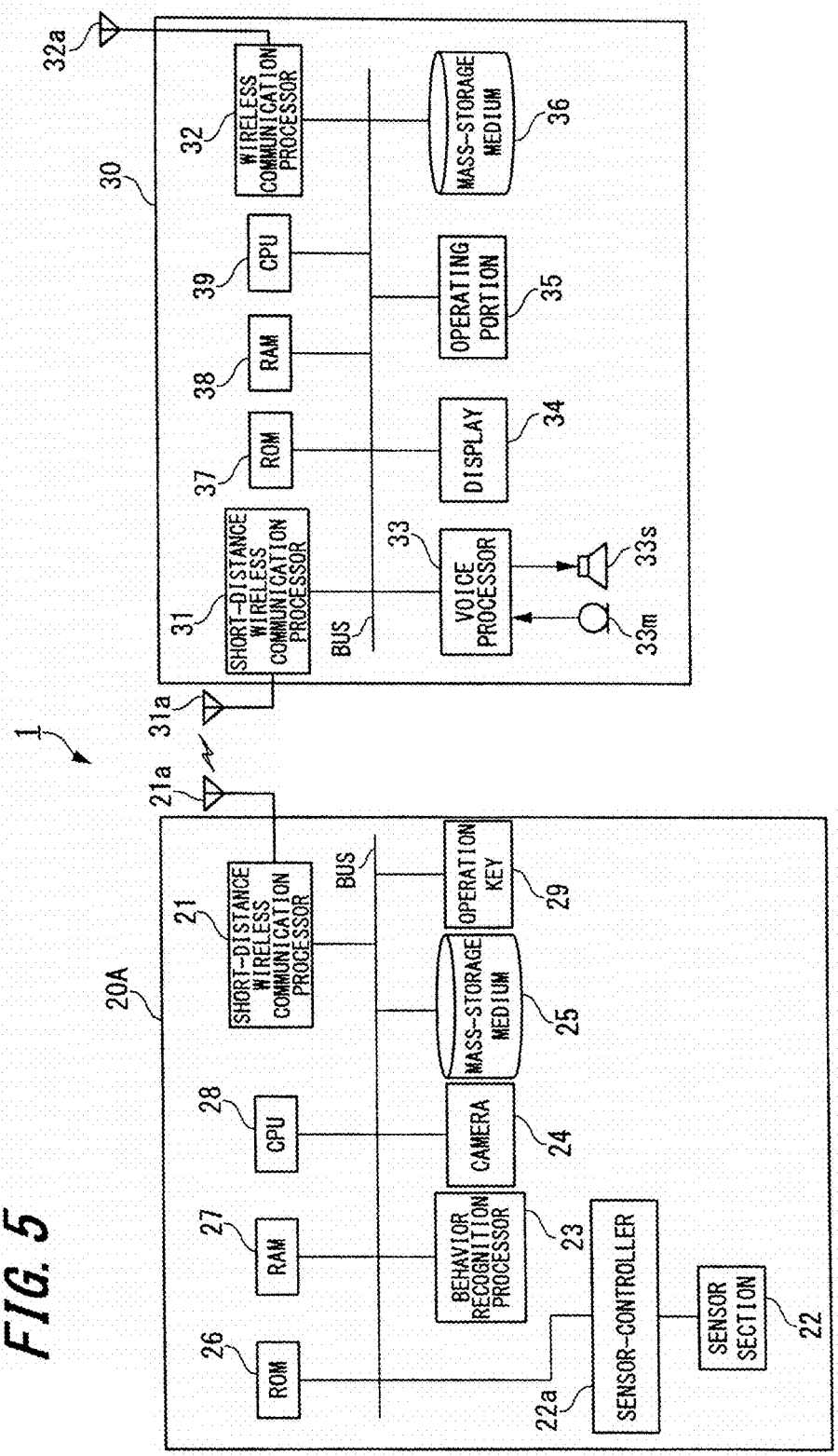
FIG. 5 illustrates another non-limiting exemplary block diagram including the internal structure of a wearable terminal device and a communication apparatus that form a photographing system, according to certain embodiments.

Next, FIG. 5 illustrates another non-limiting exemplary block diagram including an internal structure of a wearable terminal device and a communication apparatus that form a photographing system, according to certain embodiments. Specifically, the exemplary photographing system 1 shown in FIG. 5 includes the communication apparatus 30 of FIG. 2 in a modified wearable terminal 20A.

The exemplary wearable terminal 20a shown in FIG. 5 includes a structure in which a sensor controller 22a is added to the wearable terminal device 20 of FIG. 2. The sensor controller 22a acquires the detected sensor data generated in response to a motion of the wearable terminal device 20A from the sensor section 22, and analyzes the received sensor data. The sensor controller 22a transmits the analyzed sensor data to the CPU 28. For example, the sensor section 22 may include one or more motion sensors and one or more geospatial positioning sensors that respectively generate sensor data. The sensor controller 22a may receive motion sensor data generated by the motion sensors of sensor section 22 in response to motion of the wearable terminal 20a, and the sensor controller 22a may receive position sensor data generated based on a received geospatial location signal (e.g. a global positioning system (GPS) signal transmitted by a satellite) indicating a latitude, longitude, elevation, etc., of the wearable terminal device 20A. Rather than transmitting the received sensor data to the CPU 28 for processing prior to a behavior recognition determination being performed, the sensor controller 22a analyzes the received sensor data, which thereby decreases the processing load of the CPU 28.

Figure 6:
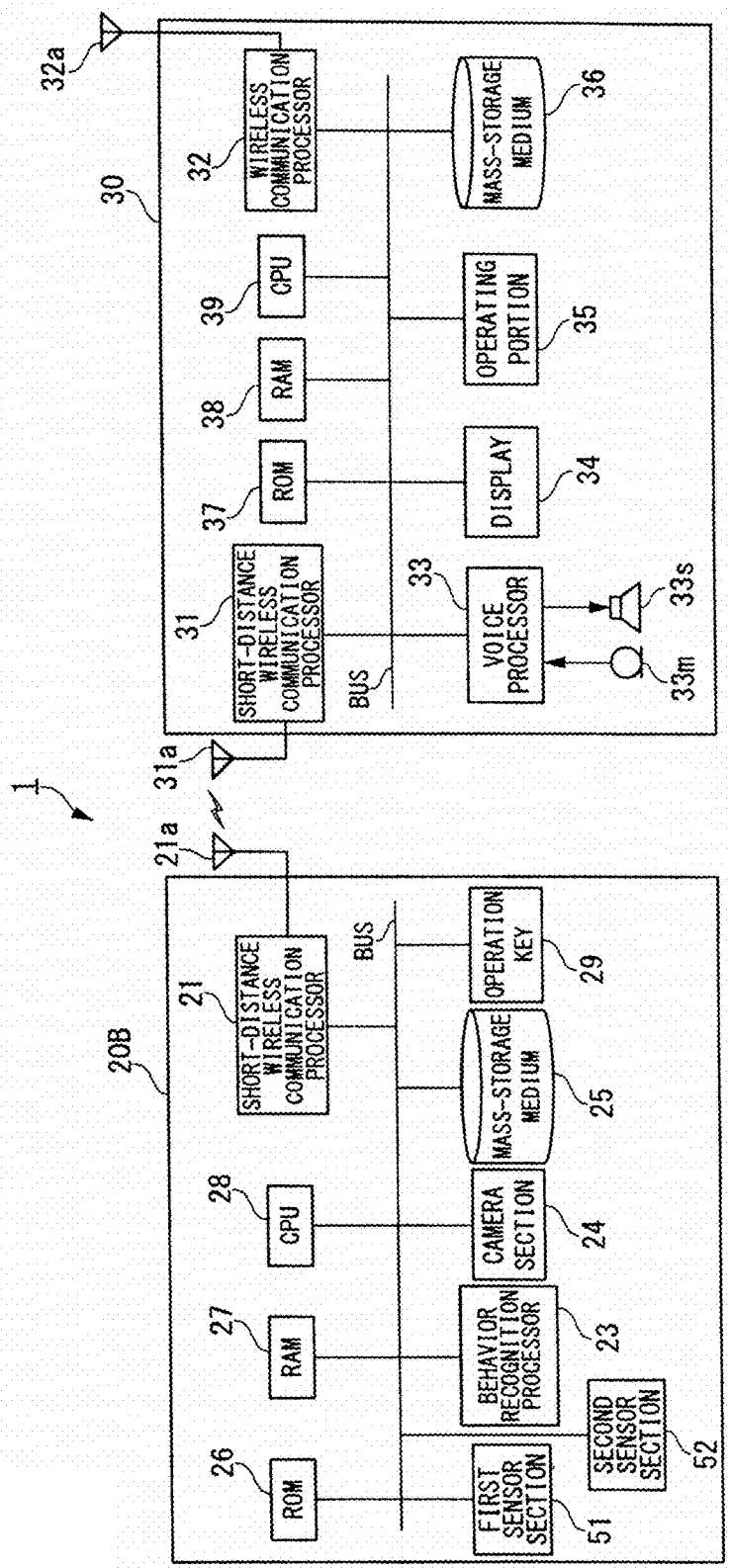
FIG. 6 illustrates another non-limiting exemplary block diagram including the internal structure of a wearable terminal device and a communication apparatus that form a photographing system, according to certain embodiments.

Next, FIG. 6 illustrates another non-limiting exemplary block diagram including an internal structure of a wearable terminal device in a communication apparatus that form a photographing system, according to certain embodiments. Specifically, the exemplary photographing system 1 includes the communication apparatus 30 from FIG. 2 and a modified wearable terminal device 20B.

The wearable terminal device 20B is modified with respect to the wearable terminal device 20 of FIG. 2 in that rather than a single sensor section 22 being included within the wearable terminal device as in FIG. 2, the wearable terminal device 20B includes a first sensor section 51 and a second sensor section 52. In certain embodiments, the first sensor section 51 and the second sensor section 52 may each include one or more motion sensors that generate motion sensor data for performing a behavior recognition determination via the behavior recognition processor 23. For example, the first sensor section 51 may include an accelerometer and the second sensor section 52 may include a gyroscope. Accordingly, acceleration data generated by the first sensor section 51 and gyroscope data generated by the second sensor section 52 may each be transmitted to the CPU 28 and later to the behavior recognition processor 23 such that a more accurate determination of the user's behavior may be performed.

In certain embodiments, the first sensor section 51 may include one or more motion sensors and the second sensor section 52 may include sensors other than motion sensors. For example, the second sensor section 52 may include one or more biological sensors that generate biological sensor data based on a physiological state of the user. Exemplary biological sensor data corresponding to a physiological state of the user includes, for example, an indication of the user's body temperature, heart rate, blood pressure, perspiration, etc., which may be determined based on various sensors corresponding to these physiological measurements (resistance thermometers (RTDs), pulse monitors, etc.). Unlike a recognition of a user's behavior or an action performed by the user as discussed above, a biological or physiological condition of the user may be implemented for controlling a photographing interval of the camera 24 such that the biological or physiological state of the user is the trigger for controlling the automatic photography. For example, the photographing interval of the camera 24 may be controlled based on a detection of a user's stress level, an emotion expressed by the user, a state of mind of the user, etc.

In embodiments including biological sensors, the behavior recognition processor 23 and/or the CPU 28 may be modified such that processing related to the determination of the user's biological or physiological condition may be performed by these processing circuitry elements. For example, the behavior recognition processor 23 may receive biological sensor data from the second sensor 52 and determine an emotional and/or biological condition of the user, and the emotion and/or biological condition of the user may be transmitted to the CPU 28 such that the CPU 28 controls a photographing interval of automatic photography captured by the camera 24.

In certain embodiments, the behavior recognition processor 23 may also receive motion sensor data from the first sensor section 51 such that the control of the photographing interval of the camera 24 performed by the CPU 28 is based both on the determined behavior/action of the user, as well as the determination result of the user's physiological, biological, emotional, etc., state generated by the biological sensor data. For example, when a user is in a resting state, some event may generate a measurable response in pulse or body temperature changes with respect to the user, and the behavior recognition processor 23 may receive sensor data corresponding to this condition and output the determination result to the CPU 28 such that the photographing interval of the camera 24 is adjusted. That is, while motion sensor data indicating that the user was resting may typically result in a increased photographing interval being determined, implementations in which the photographing interval is controlled based on a combination of motion and biological sensor data provide a more robust capability of determining a contextual environment with respect to the user, which improves the determination as to when a higher frequency of image data capturing would be desirable.

Moreover, in certain embodiments, the CPU 28 may selectively determine when motion sensor data and/or biological sensor data are applied for controlling and adjusting the photographing interval of the camera 24. For example, when the behavior recognition processor 23 determines, based on received motion sensor data from the first sensor section 51, that the user is currently running, the CPU 28 may discount the importance of changes in the user's pulse and/or body temperature since these changes are an expected result of the user's behavior. Accordingly, the CPU 28 may adjust the photographing interval of the camera 24 based mainly on the behavior recognition result and to a lesser extent on the physiological state of the user.

In certain embodiments, the second sensor section 52 may include a geospatial positioning sensor for determining a geospatial position of the wearable terminal device 20B. For example, using a GPS signal received by the geospatial position sensor included in the second sensor section 52, the CPU 28 may determine a present location of the wearable terminal device 20B (e.g. in a user's house, in a user's office, at a travel destination, etc.). Based on a determination of the current geospatial position of the wearable terminal device 20B, the CPU 28 may adjust a photographing interval of the camera section 24. Additionally, in certain embodiments, the photographing interval of the camera 24 may be adjusted by the CPU based on a combination of geospatial position data and a behavior recognition result generated by the behavior recognition processor 23. Moreover, in certain embodiments, the CPU 28 may adjust the photographing interval of the camera 24 based on a combination of inputs indicating a physiological state of the user, a geospatial position of the user, and a behavior/action of the user.

As an example of controlling a photographing interval of the camera 24 in response to a geospatial position determination of the wearable terminal device 20B, the CPU 28 may receive an indication that the wearable terminal device 20B is presently at a travel destination rather than the user's home. Additionally, the CPU 28 may receive a behavior recognition result from the behavior recognition processor 23 indicating that the user is currently walking. Based on this combination of inputs, the CPU 28 may adjust the camera 24 photographing interval such that the photographing interval is lower when it is determined that the user is walking while traveling relative to a determination that the user is walking while at home.

In certain embodiments, an imaging sensor may be included in the second sensor section 52 such that image analysis may be performed and output for inclusion in processing for adjusting a photographing interval of the camera 24. Alternatively, the CPU 28 and/or the camera 24 may include processing circuitry for performing image analysis on image data captured by the camera 24 and/or received from communications on a network by the wearable terminal device 20B. An image analysis result performed on image data captured by the camera 24 may be applied for determining a behavior or action performed by the user, as well as a current location of the user. For example, image analysis may be performed on image data captured sequentially by the camera 24 such that it is determined, based on a lack of significant temporal changes in the captured image data, that the user is currently in the resting state. Accordingly, the CPU 28 may receive the image analysis result indicating that the user is in the resting state, and the CPU 28 may control the photographing interval of the camera 24 such that it is increased in order to prevent redundant pictures from being taken while the wearable terminal device 20B is not moving. Additionally, image analysis processing may be performed on image data captured by the camera 24 such that individuals included in the image data are recognized via facial recognition methods. Accordingly, the CPU 28 may control the photographing interval of the camera 24 based on the facial recognition result. When image analysis is performed by processing circuitry included in the wearable terminal device 20B, image data may be stored over time in the RAM 27 and/or the mass-storage medium 25 such that analysis over a predetermined time period may be performed. For example, the CPU 28 may analysis sequential images included in image data stored in the RAM 27 such that a determination of temporal changes across the sequence of images is performed.

It should be appreciated that while a variety of sensor types are described herein with respect to the first sensor section 51 and the second sensor section 52, embodiments of the present disclosure may perform processing related to the control of a photographing interval of the camera 24 based on a single type of sensor data. For example, the CPU 28 may selectively perform control of the photographing interval of the camera 24 based on one of motion sensor data, biological sensor data, and image sensor data. Moreover, as mentioned previously, a combination of sensor data may also be applied for controlling the photographing interval of the camera 24.

Regarding image sensor data, and specifically regarding facial recognition techniques performed by image sensors and related processing circuitry, the CPU 28 may, in certain embodiments, control the photographing interval of the camera 24 based on predetermined relationships with recognized faces within the image data. For example, the CPU 28 may control the photographing interval of the camera 24 when the image analysis result indicates a particular user is included within an image (e.g. a correspondence between a known individual and the facial recognition analysis result may be stored in the ROM, and the CPU 28 may perform the comparison based on the stored correspondence data). Additionally, in certain embodiments, the image analysis and related facial recognition may include processing for determining an emotional state of the individuals included in the image data. For example, the image analysis may determine that an individual within an image is smiling, and the CPU 28 may control the photographing interval of the camera 24 such that the interval decreases in response to detecting the smiling individual.

Next FIG. 7 illustrates a non-limiting exemplary photographing interval table for controlling a photographing interval of a wearable terminal device based on a detected physiological state, according to certain embodiments. As discussed previously, the physiological states shown in FIG. 7 may be determined by the control circuitry included in the wearable terminal device based on sensor data received from one or more biological sensors included in the wearable terminal device.

Photographing interval table 42 of FIG. 7 includes three columns corresponding to "measurement item," "average value," and "photographing interval (min)." The measurement item column corresponds to various physiological states that may be determined by the control circuitry of the wearable terminal device based on sensor data from one or more biological sensors. The exemplary physiological conditions included in the photographing interval table 42 include body temperature, pulse, heart rate, and blood pressure. In certain embodiments, biological sensor data may be received and analyzed by the control circuitry of the wearable terminal device such that an average value of each respective measurement is taken over the time period. The control circuitry may then calculate the average value and compare the average value to the data included in the photographing interval table 42. For example, based on the received biological sensor data, the control circuitry may determine that the user's body temperature is greater than or equal to the average value "a" listed in the photographing interval table 42. In response to determining that the user's body temperature is greater than or equal to the average value "a," the control circuitry of the wearable terminal device may control the photographing interval of the wearable terminal device camera such that image data is captured at an interval corresponding to "A" minutes. Similar processing may be performed for controlling a photographing interval of a camera included in a wearable terminal device based on biological sensor data corresponding to pulse and heart rate.

FIG. 7 shows average values "d1" and "d2" corresponding to the blood pressure measurement item. In this example, different photographing interval values may be assigned to various ranges within a particular measurement item. For example, when the control circuitry of the wearable terminal device determines, based on biological sensor data received by the control circuitry, that the user's blood pressure is between the average values d1 and d2, the control circuitry may adjust the photographing interval of the wearable terminal device camera such that the photographing interval is D1 minutes. Similarly, when the control circuitry determines that the user's blood pressure is greater than the value d2, the control circuitry may control the photographing interval of the camera such that the interval is set at D2 minutes.

The time interval during which the average value of the various biological sensor measurement items is taken may be set to sufficiently capture the average value with desired accuracy. Moreover, in certain embodiments, an instantaneous value of various measurement items may be applied for determining and controlling the photographing interval of the wearable terminal device camera. Moreover, in certain embodiments, a mathematical function may be applied for determining a photographing interval based on a received value corresponding to each of the biological sensor data measurement items. Moreover, the exemplary photographing interval table may be altered such that other measurement items are included in the table and/or different average measurement values and photographing interval values are applied to each of the corresponding measurement items. Moreover, as discussed previously, the control of the photographing interval may be based on a combination of biological sensor data and other sensor data that may be received and analyzed by the wearable terminal device control circuitry. For example, the biological sensor data and photographing interval table 42 may be applied in combination with motion sensor data, geological position sensor data, and image sensor data in order to determine a photographing interval for a wearable terminal device camera.

Next FIG. 8 illustrates a non-limiting exemplary photographing interval table for controlling a photographing interval of a wearable terminal device based on a detected emotional state, according to certain embodiments. As discussed previously, an emotional state of a user may be determined based on biological sensor data inputs received by control circuitry and a wearable terminal device. For example, the control circuitry of the wearable terminal device may determine based on one or more measurements received from the biological sensor(s) that a user is happy, angry, stressed, nervous, etc. Accordingly, the determination of the user's emotional state may be applied for controlling a photographing interval of a wearable terminal device camera using methods described herein.

Referring to FIG. 8, photographing interval table 43 includes columns for "emotion" and "photographing interval (min)." In this example, the control circuitry of the wearable terminal device may determine, based on received biological sensor data, that the user is presently nervous. For example, the biological sensor data received by the control circuitry may include indications of a user's body temperature, heart rate, and blood pressure, which correspond to a state typically associated with nervousness. Based on this determination of the user's emotional state, the control circuitry of the wearable terminal device may control a photographing interval of the camera such that the interval is set to a value corresponding to the emotional state from the photographing interval table 43, which in this case corresponds to value P5. Because it may be preferable or desirable by the user that the photographing interval of the camera when the user is presently nervous is set to a value that results in fewer pictures taken then when the user is otherwise not stressed (e.g. happy), the interval value P5 may be set to a lower value than, for example, the interval values corresponding to "glad" and "happy" emotional states from the photographing interval table 43. However, the present example is not limited to any particular value of photographing interval or emotional states, and other methods may be applied for determining a photographing interval based on a determination result for the user's emotional state. Moreover, the user may adjust the data included in the photographing interval table 43 such that desired photographing interval values and/or emotional states may be directly entered using, for example, the touch screen provided in operating portion 35 of the communication apparatus 30. Similar manual entry of photographing interval table data may be performed for any of the photographing interval tables described herein.

Figure 9:
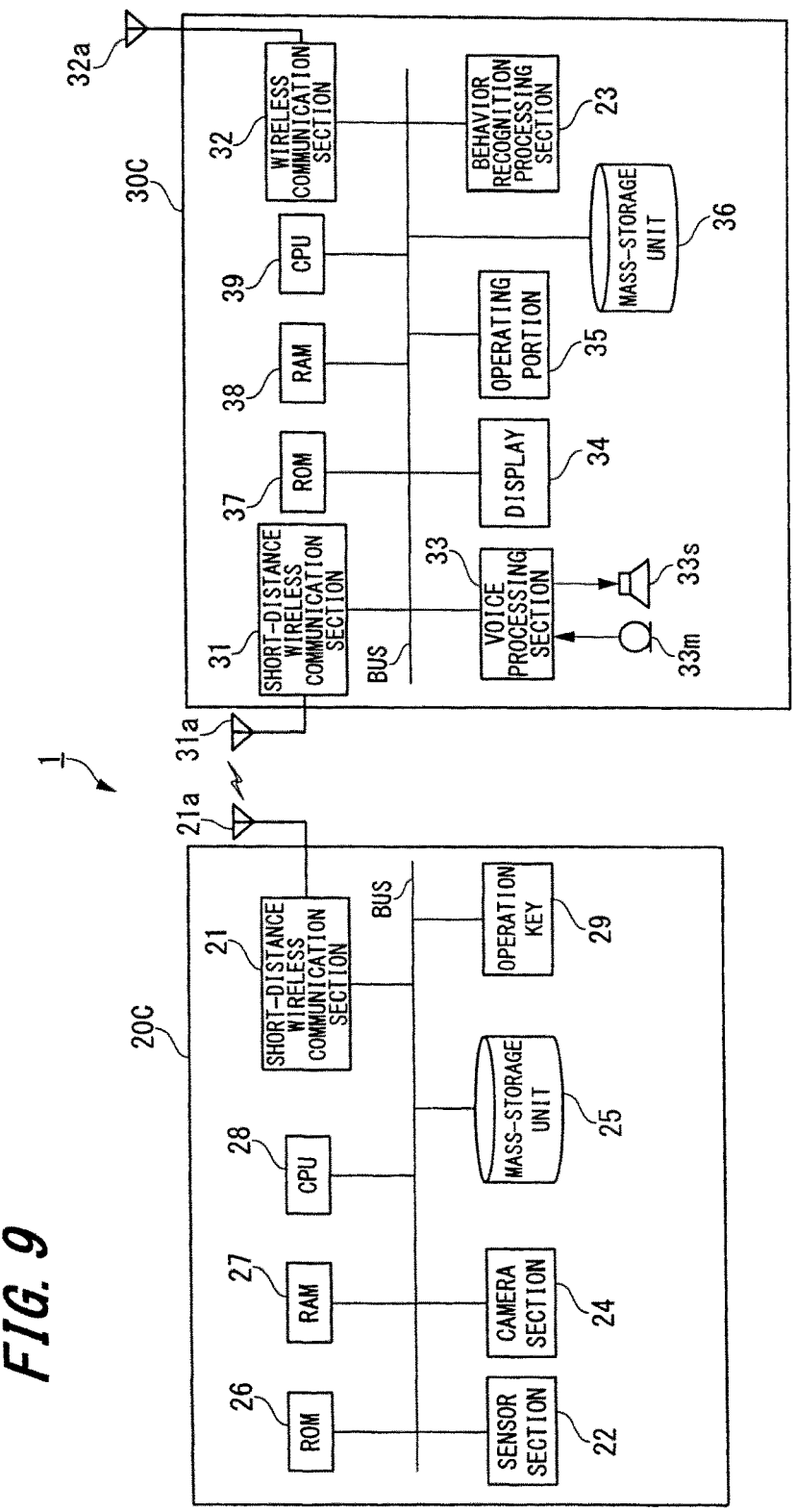
FIG. 9 illustrates another non-limiting exemplary block diagram including the internal structure of a wearable terminal device and a communication apparatus that form a photographing system, according to certain embodiments.

Next FIG. 9 illustrates another non-limiting exemplary block diagram including an internal structure of a wearable terminal device and a communication apparatus that form a photographing system, according to certain embodiments. Specifically, the exemplary photographing system 1 illustrated in FIG. 9 includes a modified wearable terminal device 20C and a modified communication apparatus 30C. The difference between the photographing system 1 of FIG. 2 and the photographing system 1 illustrated in FIG. 9 is the point by which the behavior recognition processor 23 is not provided in the wearable terminal device 20C, but rather is included in the communication apparatus 30C. That is, although all of the processing circuitry necessary for adjusting a photographing interval of the camera 24 is included in the wearable terminal device 20C, the determination as to a user's behavior, emotional state, physiological state, etc., may be performed by processing circuitry included in another device, such as the communication apparatus 30C. In this case, the sensor data generated by the sensor section 22 may be transmitted via the short-distance wireless processor 21 and the antenna 21a to the communication apparatus 30C, where the behavior recognition processor 23 performs the determination that may be applied for adjusting the photographing interval of the camera 24. Specifically, in response to receiving the sensor data from the wearable terminal device 20C, the behavior recognition processor 23 of the communication apparatus 30C may perform a determination as to the user's behavior and return the results to the wearable terminal device 20C of the other short-distance wireless processor 31 and the antenna 31a. In response to receiving the recognition result from the communication apparatus 30C, the CPU 28 of the wearable terminal device 20C may control the photographing interval of the camera 24 such that the interval corresponds to the determined behavior corresponding to the user.

Figure 10:
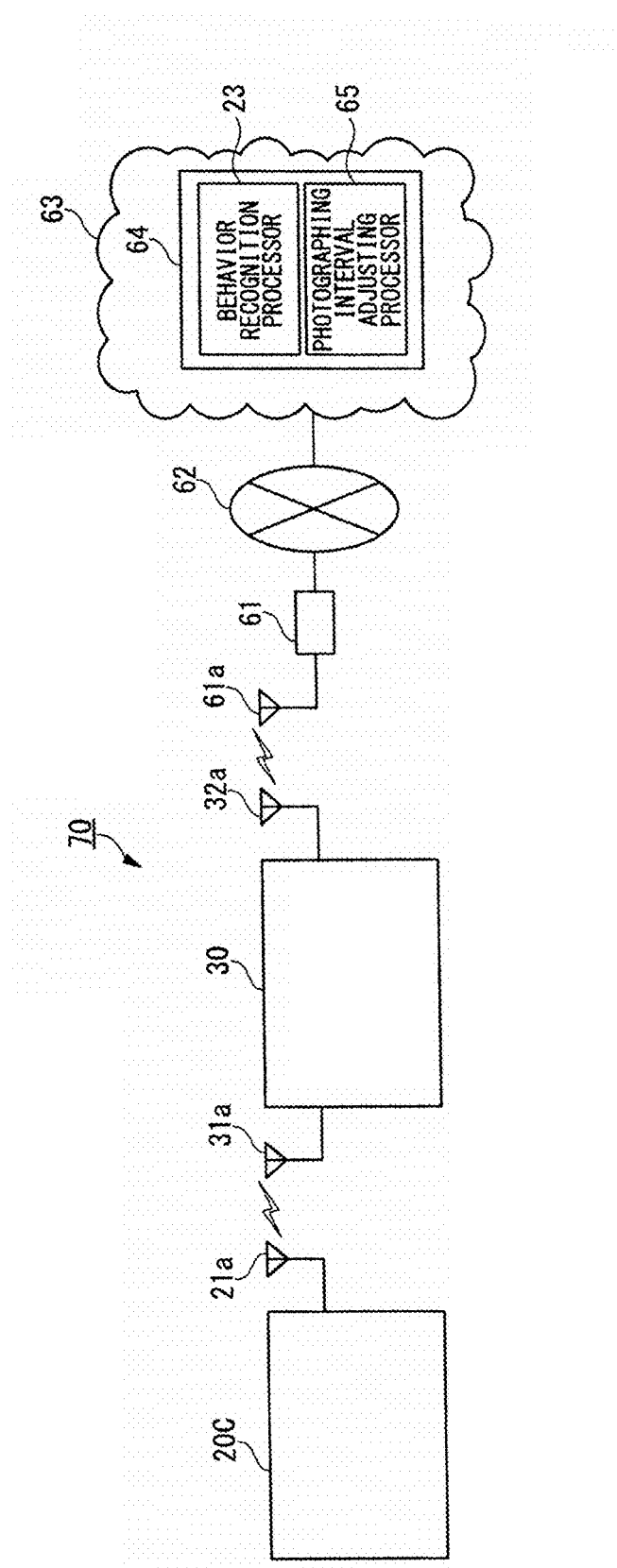
FIG. 10 illustrates a non-limiting exemplary photographing system that includes a server with circuitry for controlling a photographing interval of a wearable terminal device, according to certain embodiments.

Next, FIG. 10 illustrates a non-limiting exemplary photographing system that includes a server with circuitry for controlling a photographing interval of a wearable terminal device, according to certain embodiments.

The exemplary photographing system 70 illustrated in FIG. 10 includes a server 64 included within a cloud 63. The cloud 63 may be accessed via a network 62 via base station 61 and antenna 61a. For example, the wearable terminal device 20C may generate sensor data corresponding to a user's behavior, physiological state, emotion state, etc., and transmit the sensor data to the communication apparatus 30. The communication apparatus 30 may transmit the sensor data to the server 64 via the network 62, the base station 61, and the antenna 61a. In response to receiving the sensor data, the server 64 may determine, for example, a user's behavior, based on processing performed by the behavior recognition processor 23. Additionally, based on the result of the behavior recognition processing, a photographing interval adjusting processor 65 may control the photographing interval of a camera included in the wearable terminal device 20C. That is, the photographing interval processor 65 may perform processing that was previously described as being performed by the CPU 28 in the wearable terminal device 20C. The control signal corresponding to the adjusting of the photographing interval may be transmitted from the server 64 to the communication apparatus 30 via the network 62, and the communication apparatus 30 may transmit the control signal to the wearable terminal device 20C such that the CPU 28 can control the photographing interval of the camera 24 based on the control signal generated by the server 64. Accordingly, the processing workload of the control circuitry included in the wearable terminal device 20C may be decreased since processing previously described as being performed by the control circuitry of the wearable terminal device 20C is now performed by processing circuitry included in the server 64. Similar results may be obtained by including one or more of the behavior recognition processor 23 and the photographing interval adjusting processor 65 within the communication apparatus 30 such that the processing corresponding to the adjusting of the photographing interval is distributed across the processing circuitry included in various devices. Accordingly, circuitry included in the wearable terminal device 20C may be simplified.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A wearable terminal device comprising: circuitry configured to receive sensor data from one or more sensors, wherein the sensor data corresponds to a behavior of a user in possession of the wearable terminal device; determine, based on the sensor data, the behavior of the user; and control, based on the determined behavior of the user, a photographing interval of a camera.

(2) The wearable terminal device of (1), wherein the photographing interval of the camera determines the frequency at which the camera performs automatic capturing of image data.

(3) The wearable terminal device of (1) or (2), wherein the one or more sensors include at least one motion sensor.

(4) The wearable terminal device of any one of (1) to (3), wherein the sensor data includes an indication of a motion of one or more of the wearable terminal device and the user, and the circuitry is further configured to determine the behavior of the user based on the indication of the motion.

(5) The wearable terminal device of any one of (1) to (4), wherein the circuitry is configured to decrease the photographing interval when the indication of the motion indicates that the motion is decreasing.

(6) The wearable terminal device of any one of (1) to (5), wherein: the one or more sensors include at least one geospatial positioning sensor, and the circuitry is further configured to determine the behavior of the user based on the indication of the motion and a location input received from the at least one geospatial positioning sensor.

(7) The wearable terminal device of any one of (1) to (6), wherein the circuitry is configured to decrease the photographing interval when a change in the location input decreases.

(8) The wearable terminal device of any one of (1) to (7), wherein: the one or more sensors include at least one biological sensor configured to generate biological sensor data based on a physiological state of the user, and the circuitry is further configured to determine the behavior of the user based on the indication of the motion and the biological sensor data.

(9) The wearable terminal device of any one of (1) to (8), wherein the photographing interval of the camera determines the frequency at which the camera performs automatic capturing of image data, the circuitry is configured to perform image analysis of each image included in the image data captured by the camera, and the circuitry is further configured to determine the behavior of the user based on the indication of the motion and a result of the image analysis.

(10) The wearable terminal device of any one of (1) to (9), wherein the result of the image analysis includes an indication of temporal changes in the image data.

(11) The wearable terminal device of any one of (1) to (10), wherein: the circuitry is configured to recognize one or more faces in the image data, and the circuitry is further configured to determine the behavior of the user based on the indication of the motion and the one or more faces recognized in the image data.

(12) The wearable terminal device of any one of (1) to (11), wherein the camera is included in the wearable terminal device.

(13) A wearable terminal device comprising: circuitry configured to receive sensor data from one or more sensors, wherein the sensor data corresponds to a psychological state of a user in possession of the wearable terminal device; determine, based on the sensor data, the psychological state of the user; and control, based on the determined psychological state of the user, a photographing interval of a camera.

(14) The wearable terminal device of (13), wherein the one or more sensors include at least one biological sensor.

(15) The wearable terminal device of (13) or (14), wherein the at least one biological sensor measures physiological conditions of the user's body.

(16) The wearable terminal device of any one of (13) to (15), wherein the physiological conditions include one or more of heart rate, temperature, perspiration, breathing rate, and blood pressure.

(17) The wearable terminal device of any one of (13) to (16), wherein the one or more sensors include at least one motion sensor; the sensor data includes an indication of a motion of one or more of the wearable terminal device and the user, and the circuitry is further configured to control the photographing interval of the camera based on the psychological state of the user and the motion.

(18) The wearable terminal device of any one of (13) to (17), wherein the camera is included in the wearable terminal device.

(19) A photographing system comprising: a wearable terminal device including a camera configured to capture image data at a photographing interval; one or more sensors configured to generate sensor data, wherein the sensor data corresponds to a behavior of a user in possession of the wearable terminal device; and circuitry configured to transmit the sensor data to one or more external devices, receive an indication of a behavior of the user, and determine, based on the indication of the behavior of the user, the photographing interval of the camera, and control the camera to capture the image data at the determined photographing interval; and a communication device including circuitry configured to receive the sensor data from the wearable terminal device, determine, based on the sensor data, the behavior of the user, and output the determination result of the behavior of the user to the wearable terminal device.

(20) The photographing system of (19), wherein the circuitry of the communication apparatus is further configured to: determine, based on the indication of the behavior of the user, the photographing interval of the camera, and control the camera to capture the image data at the determined photographing interval.

The invention claimed is:

1. A wearable terminal device comprising:
   circuitry configured to
      receive sensor data from one or more sensors, wherein the sensor data corresponds to a behavior of a user who is wearing the wearable terminal device;
      determine, based on the behavior of the user, a corresponding rate of change in an environment surrounding the wearable terminal device;
      capture an image by a camera of the wearable terminal device;
      identify a plurality of persons in the captured image;
      identify a predetermined relationship with at least one of the plurality of persons identified in the captured image; and
      control, based on the determined rate of change of the environment and the predetermined relationship, a photographing interval of the camera.

2. The wearable terminal device of claim 1, wherein the photographing interval of the camera determines the frequency at which the camera performs automatic capturing of image data.

3. The wearable terminal device of claim 1, wherein the one or more sensors include at least one motion sensor.

4. The wearable terminal device of claim 3, wherein the sensor data includes an indication of a motion of one or more of the wearable terminal device and the user, and
the circuitry is further configured to determine the behavior of the user based on the indication of the motion.

5. The wearable terminal device of claim 4, wherein the circuitry is configured to decrease the photographing interval based on an increase in the rate of change of the environment surrounding the wearable terminal device.

6. The wearable terminal device of claim 4, wherein:
the one or more sensors include at least one geospatial positioning sensor, and the circuitry is further configured to determine the behavior of the user based on the indication of the motion and a location input received from the at least one geospatial positioning sensor.

7. The wearable terminal device of claim 6, wherein the circuitry is configured to decrease the photographing interval when a change in the location input increases.

8. The wearable terminal device of claim 4, wherein:
the one or more sensors include at least one biological sensor configured to generate biological sensor data based on a physiological state of the user, and
the circuitry is further configured to determine the behavior of the user based on the indication of the motion and the biological sensor data.

9. The wearable terminal device of claim 4, wherein
the photographing interval of the camera determines the frequency at which the camera performs automatic capturing of image data,
the circuitry is configured to perform image analysis of each image included in the image data captured by the camera, and
the circuitry is further configured to determine the behavior of the user based on the indication of the motion and a result of the image analysis.

10. The wearable terminal device of claim 9, wherein the result of the image analysis includes an indication of temporal changes in the image data.

11. The wearable terminal device of claim 9, wherein:
the circuitry is configured to recognize one or more faces in the image data, and
the circuitry is further configured to determine the behavior of the user based on the indication of the motion and the one or more faces recognized in the image data.

12. The wearable terminal device of claim 1, wherein the camera is included in the wearable terminal device.

13. A method of adjusting a photographing interval of a camera, the method comprising:
receiving by circuitry, sensor data from one or more sensors, wherein the sensor data corresponds to a behavior of a user who is wearing the wearable terminal device;
determining, based on the behavior of the user, a corresponding rate of change in an environment surrounding the wearable terminal device;
capturing an image by a camera of the wearable terminal device;
identifying a plurality of persons in the captured image;
identifying a predetermined relationship with at least one of the plurality of persons identified in the captured image; and
controlling by circuitry, based on the determined rate of change of the environment and the predetermined relationship, the photographing interval of the camera.

14. The method of claim 13, further comprising:
decreasing by circuitry, the photographing interval based on an increase in the rate of change of the environment surrounding the wearable terminal device.

15. The method of claim 13, wherein the one or more sensors include at least one geospatial positioning sensor.

16. The method of claim 15, further comprising:
determining the behavior of the user based on the indication of the motion and a location input received from the at least one geospatial positioning sensor; and
decreasing by circuitry, the photographing interval when a change in the location input increases.

17. A non-transitory computer readable medium having stored thereon a program that when executed by a computer causes the computer to execute a method adjusting a photographing interval of a camera, the method comprising:
receiving sensor data from one or more sensors, wherein the sensor data corresponds to a behavior of a user who is wearing the wearable terminal device;
determining, based on the behavior of the user, a corresponding rate of change in an environment surrounding the wearable terminal device;
capturing an image by a camera of the wearable terminal device;
identifying a plurality of persons in the captured image;
identifying a predetermined relationship with at least one of the plurality of persons identified in the captured image; and
controlling based on the determined rate of change of the environment and the predetermined relationship, the photographing interval of the camera.

18. The non-transitory computer readable medium of claim 17, the method further comprising:
decreasing the photographing interval based on an increase in the rate of change of the environment surrounding the wearable terminal device.

19. The non-transitory computer readable medium of claim 17, wherein the one or more sensors include at least one geospatial positioning sensor.

20. The non-transitory computer readable medium of claim 19, the method further comprising:
determining the behavior of the user based on the indication of the motion and a location input received from the at least one geospatial positioning sensor; and
decreasing the photographing interval when a change in the location input increases.

21. The wearable terminal device of claim 1, wherein the circuitry is further configured to control the photographing interval of the camera based on an emotional state of the identified person.

* * * * *